UNITED STATES PATENT OFFICE.

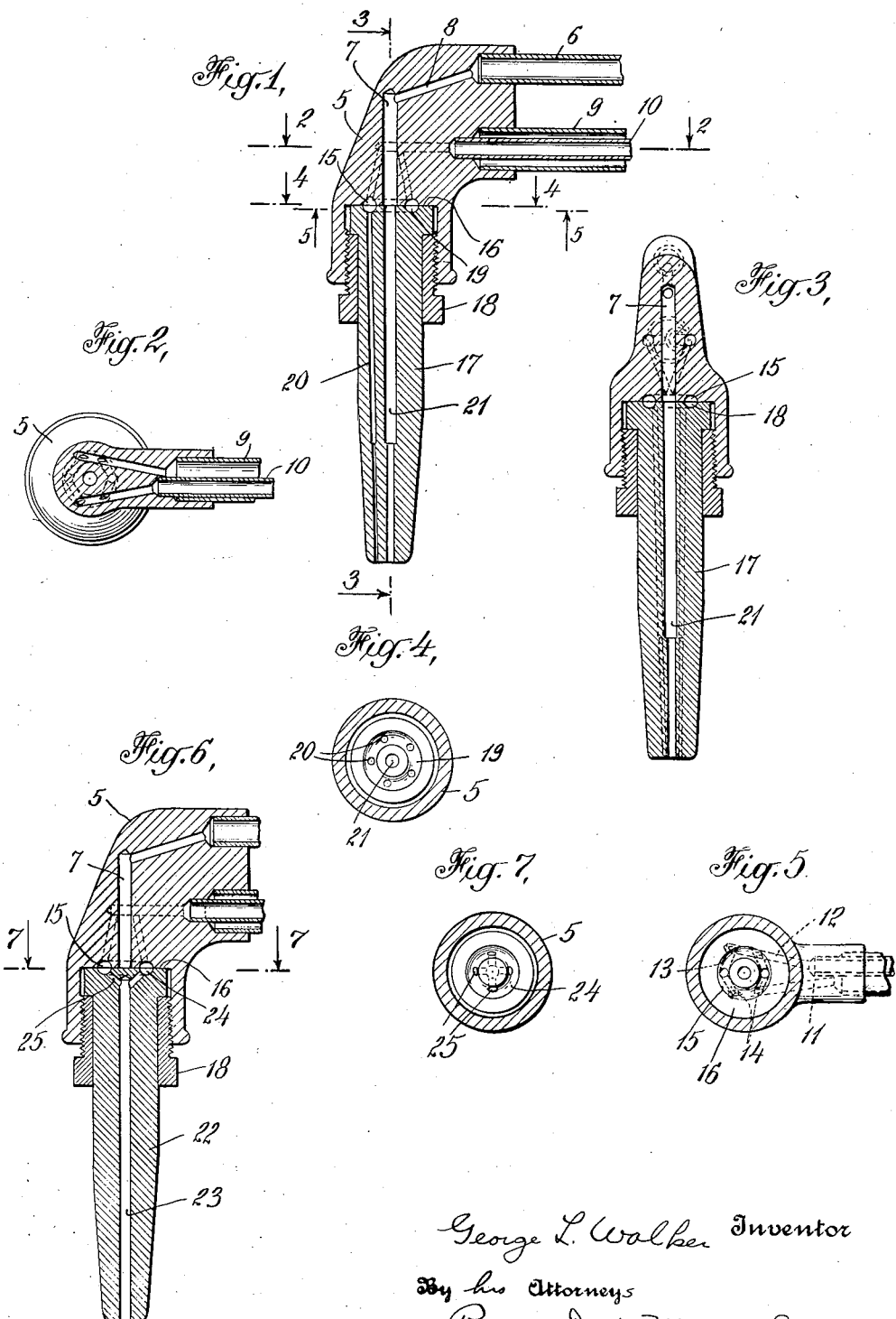

GEORGE L. WALKER, OF NEW YORK, N. Y., ASSIGNOR TO AIR REDUCTION COMPANY, INC., A CORPORATION OF NEW YORK.

COMBINATION-BLOWPIPE.

1,395,537.   Specification of Letters Patent.   Patented Nov. 1, 1921.

Application filed January 8, 1919. Serial No. 270,116.

*To all whom it may concern:*

Be it known that I, GEORGE L. WALKER, a citizen of the United States, residing at New York, in the county of New York, State of New York, have invented certain new and useful Improvements in Combination-Blowpipes; and I do hereby declare the following to be a full, clear, and exact description of the invention, such as will enable others skilled in the art to which it appertains to make and use the same.

This invention relates to blowpipes and has for its particular object the provision of a combination blowpipe or one which may be used interchangeably for heating or welding or for cutting by the simple substitution of a suitable tip, the tip being readily removable from the head to facilitate such substitution.

Further objects and advantages of my invention will be apparent, as it is better understood, by reference to the following specification when read in connection with the accompanying drawing, illustrating the preferred embodiment thereof, in which—

Figure 1, is a longitudinal section through the blowpipe and illustrates a cutting tip assembled with the head;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a view similar to Fig. 1 but illustrates a heating or welding tip assembled with the head, and Fig. 7 is a section on the line 7—7 of Fig. 6.

A blowpipe capable of use for cutting operations, as well as for heating and welding, may be advantageously employed wherever such operations are carried out, and it is particularly desirable, where the first cost of the apparatus must be considered, to provide the blowpipe which, through the simple substitution of a suitable tip, may be readily converted for efficient use in welding or cutting, as desired.

It has, nevertheless, been customary to provide separate blowpipes for the two operations. The cutting blowpipe requires an additional oxidizing gas passage which is not found in the welding blowpipe and which, of course, must be provided for in a combination structure. So far as I am aware, no simple and effective solution of the problem presented has been heretofore suggested. I have discovered that a combination blowpipe, capable of employment in carrying out heating or welding operations or cutting as desired, may be readily constructed in the manner hereinafter described and will meet all of the requirements in carrying out the desired operations.

Referring to the drawing, 5 indicates a head to which a pipe 6 adapted to carry a supply of oxidizing gas is secured, a centrally disposed passage 7 in the head being arranged to receive the oxidizing gas from the pipe 6 from a passage 8. A pipe 9 adapted to deliver combustible gas to the head is secured thereto and incloses a similar smaller pipe 10 for the oxidizing gas. Passages 11 and 12 receive the gases from the pipes 9 and 10 and deliver them through branch passages 13 and 14 to an annular channel 15, formed in a seat 16, and surrounding the passage 7.

A cutting tip 17 is secured to the head 5 by a nut 18, and is provided at its inner end with a surface conforming to the seat 16 and forming therewith, when the tip is properly assembled with the head, substantially gastight seals on both sides of the channel 15. A channel 19 corresponding to the channel 15 is formed in the end of the tip 17, the two channels coöperating to provide a mixing chamber for the oxidizing and combustible gases which escape through the heating jet passages 20 extending through the tip 17 and preferably concentrically arranged about the oxidizing jet passage 21 which is axially disposed within the tip and communicates directly with the passage 7 in the head.

As will be readily understood when the parts are assembled, as in Fig. 1, oxidizing gas from the pipe 6 will be delivered through the passages 7 and 8 to the oxidizing jet passage 21. The oxidizing and combustible gases from the pipes 16 and 9 will be delivered through the communicating passages to the mixing chamber formed by the channels 15 and 19 and will thence pass through the heating jet passages 20 in the tip. The blowpipe may thus be operated according to the well understood principles of cutting with oxidizing gas.

In Figs. 6 and 7 of the drawing, I have illustrated a tip 22 provided with a single heating jet discharge passage 23 and adapted to be assembled by means of the nut 18 with the head 5, as previously described. The heating jet discharge passage 23 does not extend entirely through the tip 22, the rear end of which is adapted to close the passage 7 in the head. A channel 24, corresponding to and coöperating with the channel 15 in the head, is provided at the rear end of the tip 22 and a plurality of ducts 25 connect the channel 24 to the heating jet discharge passage 23, to permit the mixture of gases formed in the mixing chamber provided by the channels 15 and 24 to escape to the heating jet discharge passage 23.

Thus, by the removal of the cutting tip 17 and the substitution of the tip 22, the blowpipe may be readily converted for use in heating and welding operations, instead of in cutting operations, for which the tip 17 is alone adapted. The rear end of the tip 22 coöperates with the seat 16 in the head, to provide a substantially gas-tight joint and to prevent premature mixing or escape of the gases, otherwise than in the predetermined manner.

The combination blowpipe herein described is available for all of the purposes for which two separate blowpipes have been heretofore commonly used, and is particularly available where, for any reason, it does not seem desirable to purchase, store or transport two separate blowpipes for carrying out the several operations.

While the preferred embodiment of the invention has been shown, it will be understood that various changes in the details of construction may be made, without departing from the principle of the invention.

1. In a device of the character described, the combination of a head having a seat and a plurality of gas passages terminating therein, an annular channel connecting two of said passages and a tip having means for closing the other passage when said tip is assembled with said head, and a surface coöperating with said seat to form a gas-tight joint, a discharge passage and communicating means between said discharge passage and channel.

2. In a device of the character described, the combination of a head having a central passage for oxidizing gas, a seat in which said central passage terminates, passages for oxidizing and combustible gases laterally spaced from said central passage, a single channel in said seat surrounding said central passage, said laterally spaced passages terminating in said channel and a removable tip adapted to be assembled with said head, and having a surface coöperating with said seat to form a gas tight joint.

3. In a device of the character described, the combination of a head having a central passage for oxidizing gas, a seat on which said central passage terminates, passages for oxidizing and combustible gases laterally spaced from said central passage, a channel in said seat surrounding said central passage, said laterally spaced passages terminating in said channel and a removable tip adapted to be assembled with said head having a surface coöperating with said seat to form a gas-tight joint, means for closing said central passage, a discharge passage and communicating means between said discharge passage and channel.

4. In a device of the character described, the combination of a head having a seat, and a plurality of gas passages terminating therein, and a removable tip having means for closing one of said passages when said tip is assembled with said head, a surface coöperating with said seat to form a gas-tight joint, a discharge passage, a single circular channel in said surface and communicating means between said channel and discharge passage, said channel communicating with the remaining passages in said head.

5. In a device of the character described, the combination of a head having a seat and central and laterally disposed passages terminating in said seat, means for supplying oxidizing gas to the central passage and oxidizing and combustible gases respectively to the laterally disposed passages, a single annular channel in said seat connecting two of said passages and a tip adapted to be assembled with said head and having a surface coöperating with said seat to form a gas-tight joint and passages communicating respectively with the central passage in the head and with the channel.

In testimony whereof I affix my signature.

GEORGE L. WALKER.